W. H. LETZ.
CLUTCH MECHANISM FOR CORN PLANTERS.
APPLICATION FILED AUG. 3, 1916.
1,238,158.
Patented Aug. 28, 1917.
3 SHEETS—SHEET 1.
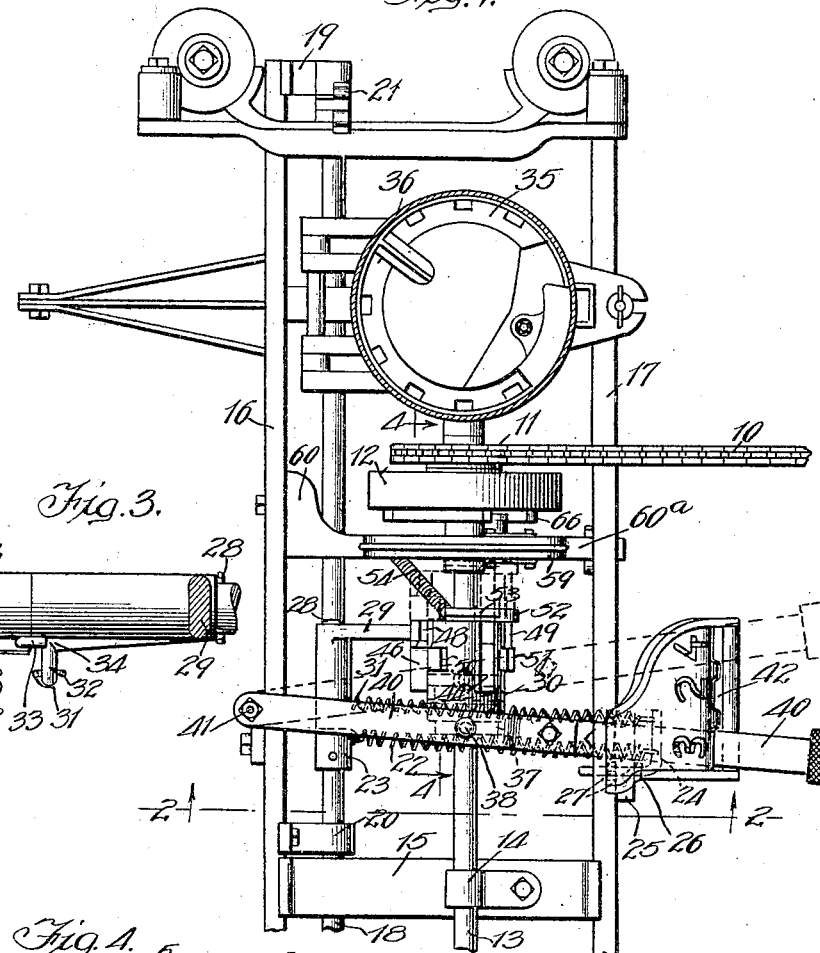
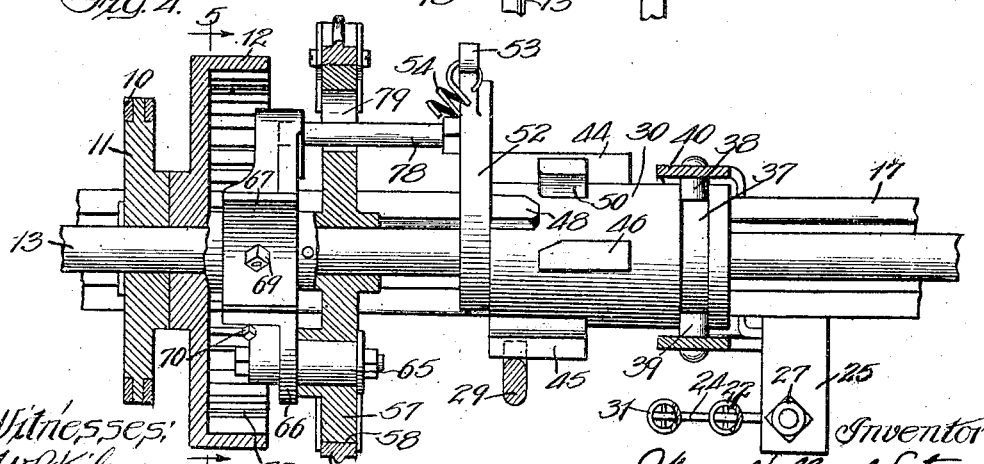

W. H. LETZ.
CLUTCH MECHANISM FOR CORN PLANTERS.
APPLICATION FILED AUG. 3, 1916.
1,238,158.
Patented Aug. 28, 1917.
3 SHEETS—SHEET 2.
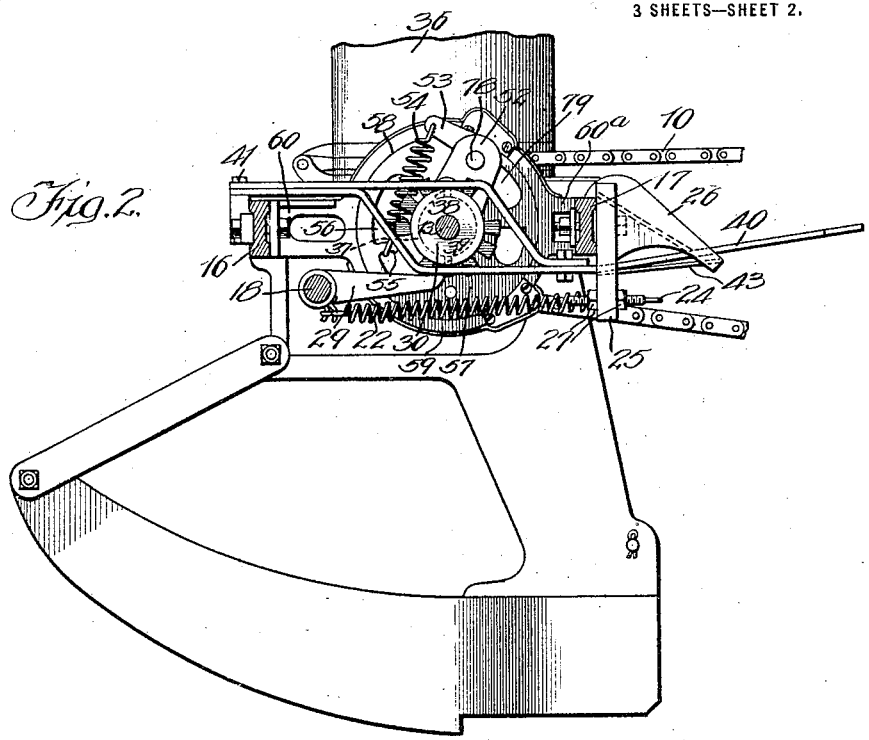
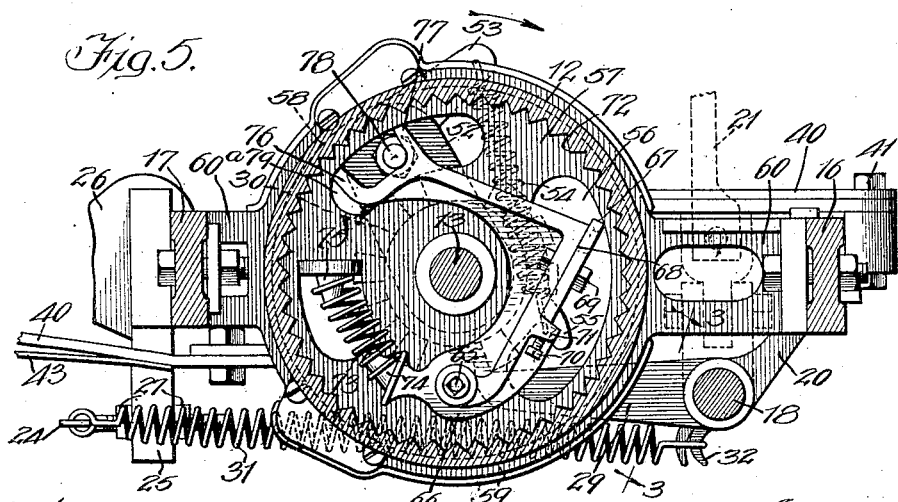
Witnesses:
W. P. Kilroy
Harry R. L. White
Inventor:
Wm. Holland Letz,
By John Howard McElroy
his Atty.

W. H. LETZ.
CLUTCH MECHANISM FOR CORN PLANTERS.
APPLICATION FILED AUG. 3, 1916.
1,238,158.
Patented Aug. 28, 1917.
3 SHEETS—SHEET 3.
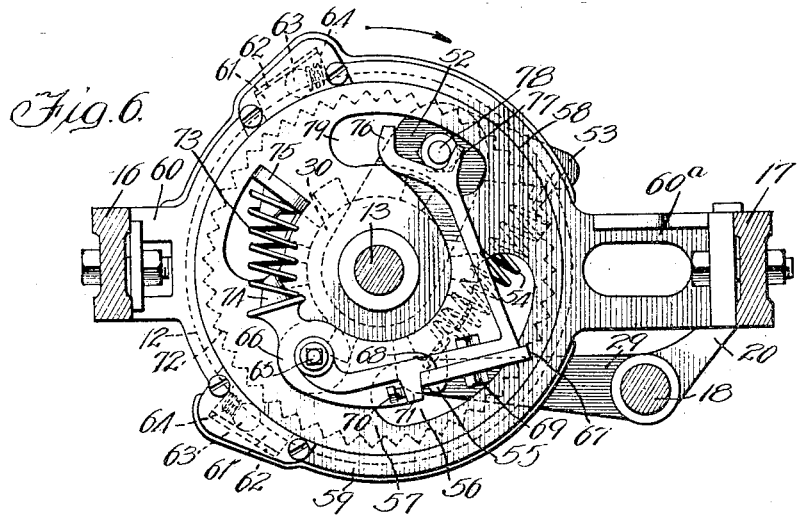
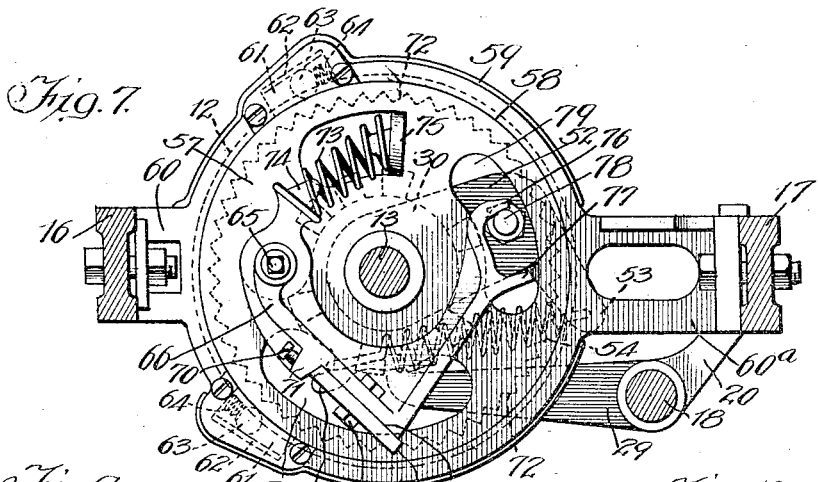
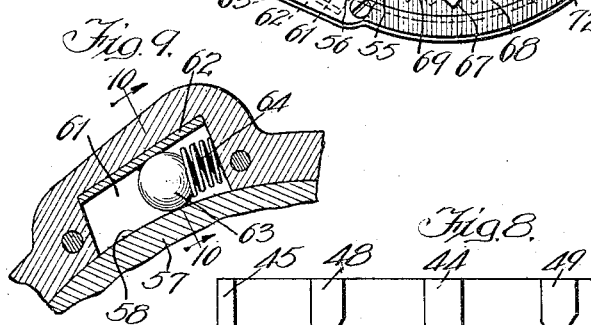
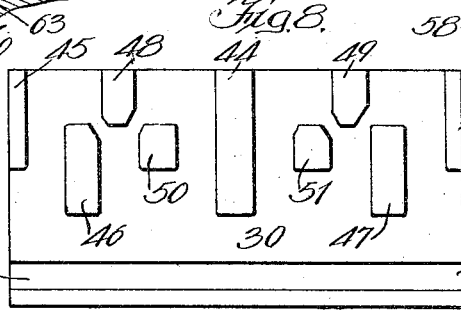
Witnesses:
Inventor:

UNITED STATES PATENT OFFICE.

WILLIAM HOLLAND LETZ, OF CROWN POINT, INDIANA, ASSIGNOR TO THE LETZ MANUFACTURING COMPANY, OF CROWN POINT, INDIANA, A CORPORATION OF INDIANA.

CLUTCH MECHANISM FOR CORN-PLANTERS.

1,238,158.  Specification of Letters Patent.  Patented Aug. 28, 1917.

Application filed August 3, 1916. Serial No. 112,895.

*To all whom it may concern:*

Be it known that I, WILLIAM HOLLAND LETZ, a citizen of the United States, and a resident of Crown Point, in the county of Lake and State of Indiana, have invented certain new and useful Improvements in Clutch Mechanisms for Corn-Planters, of which the following is a full, clear, and exact specification.

My invention is concerned with clutch mechanisms for corn planters of the type in which the clutch mechanism embodies a driving clutch member loosely journaled relative to a detent element carrying a driven clutch member, which detent element has loosely mounted relative thereto a stop member connected to the detent element by a spring which is put under increased tension when the stop member is arrested, thereby disengaging the two clutch members to stop the driven clutch member while leaving the driving clutch member free to continue its movement, and my invention is concerned primarily with a novel detent mechanism which operates more certainly and satisfactorily than any such mechanisms heretofore used in such a combination.

To illustrate my invention, I annex hereto three sheets of drawings in which the same reference characters are used to designate identical parts in all the figures, of which,—

Figure 1 is a top plan view of one end of the runner frame of a corn planter embodying my invention, with the upper portion of the seed box removed and in horizontal section;

Fig. 2 is a section on the line 2—2 of Fig. 1;

Fig. 3 is a detail in section on the line 3—3 of Fig. 5;

Fig. 4 is a section on the line 4—4 of Fig. 1, but on an enlarged scale;

Fig. 5 is a section on the line 5—5 of Fig. 4;

Fig. 6 is a view similar to Fig. 5, but with the rim of the driving cup omitted and its position indicated in dotted lines, and with the parts in operating position, the parts in Fig. 5 being shown in the inoperative position in which the seed shaft is at rest;

Fig. 7 is a view similar to Fig. 6, but with the parts at the position they assume just prior to the disengagement of the clutch dog from the driving cup to stop the rotation of the seed shaft;

Fig. 8 is a plan view of the periphery of the stop sleeve extended;

Fig. 9 is an enlarged detail of the detent mechanism on the line 9—9 of Fig. 10; and Fig. 10 is a similar view in section on the line 10—10 of Fig. 9.

The runner frame, one end of which is shown in Fig. 1, will, of course, be suitably connected to the main frame, and a sprocket wheel on the shaft of the main frame or one of the covering wheels will be connected by the sprocket chain 10 with the sprocket wheel or pinion 11 rigidly secured on the hub of the driving cup 12, which is loosely mounted on the seed shaft 13, which is journaled in suitable bearings 14 secured to the upper side of brackets 15 which are located at suitable intervals between the longitudinal bars 16 and 17 making up the body of the runner frame. The rock shaft 18, extending parallel to the seed shaft 13, is likewise journaled in suitable bearings 19 and 20 extending inward and downward from and secured to the rear side of the bar 16. This rock shaft has secured on its outer ends the forks 21, which are adapted to be actuated at each hill by the buttons on the customary check-row wire to rock the shaft 18 against the tension of the helically-coiled contractile spring 22, one end of which is secured to the short arm projecting from the collar 23 pinned on the rock shaft, while the other end is secured to the angular arm 24, which has one end threaded and passed through a downwardly extending arm 25 of a bracket 26 which is bolted to the bar 17. A pair of lock nuts 27 placed on either side of the arm 26 enables me to adjust the position of the arm 24, and thus regulate the tension of the spring 22. Journaled on the rock shaft 18 between the arm 23 and and the cotter pin 28 is the hub of the hook-shaped stop dog 29, the nose of which is normally held in engagement with the periphery of the stop sleeve 30 mounted on the seed shaft 13 and constructed in a manner to be subsequently described. This engagement of the nose of the stop dog 29 with the periphery of the sleeve 30 is effected by a second helically-coiled contractile spring 31 similar to the spring 22, and having one end connected to the same arm 24, while the other end is connected to the lug 32 extending downwardly from the hub of the stop dog 29. When the rock shaft 18 is rocked against the tension of the spring 22 by the action of the buttons on the check-row wire on the fork 21, it carries with it the stop dog 29 by reason of the engagement of the lug 33 on the collar 23 with the projection 34 on the hub of the stop dog 29, and by the connections to be subsequently described, the seed shaft 13 is then coupled to the driving cup 12 so as to be rotated thereby.

The seed shaft 13 is connected by any of the customary mechanisms with the seed plate 35, mounted to rotate in the bottom of the seed box 36 and having the customary recesses in its periphery, each of which is adapted to contain a grain of corn, so that by regulating the angular rotation of the seed plate for each hill of corn, the number of grains planted therein can be regulated exactly.

Returning now to the stop sleeve 30 and its connections to the driving cup 12, I will explain the construction of the sleeve and connections whereby the machine can be arranged to drop two, three, or four grains of corn in each hill, as may be desired. As is best shown in Figs. 1 and 4, the sleeve 30 has the annular channel 37 therein, which is engaged by the pins 38 and 39 extending downwardly and upwardly, respectively, from the loop formed in the foot lever 40 pivoted at 41 to the bar 16. The free end of the foot lever 40 extends beneath the bar 17 and through a horizontal slot 42 formed in the bracket 26, and provided in its upper edge with three recesses to engage and hold the foot lever by reason of the tension of the leaf spring 43, shown in Fig. 5, in whichever one of the three recesses or positions may be selected. As is seen in Fig. 1, the lowermost recess is marked 3, the middle one 2, and the uppermost one 4, and it will be understood that when the foot lever is adjusted in these various positions, the dropping mechanism will deliver three, two or four grains to each hill. The stop sleeve 30 is loosely mounted on the seed shaft 13, and as the foot lever 40 is shifted, the sleeve 30 moves with it to bring the three different rows of lugs into the vertical plane of the nose of the stop dog 29. As best seen in Fig. 8, the stop sleeve 30 has projecting radially from the surface thereof eight teeth, 44, 45, 46, 47, 48, 49, 50 and 51, which are of the shape and dimensions clearly shown in said figure. When the foot lever is in the full-line position shown in Fig. 1, the nose of the stop dog 29 is in the plane of the row of four stops formed by the upper ends of the lugs 44 and 45 and by the lugs 48 and 49. This means that by the mechanism to be subsequently described, the shaft 13 will be rotated only one quarter of a turn each time it is set in motion with the stop sleeve 30 thus adjusted, and as twelve grains of corn are delivered by each complete rotation of the seed shaft, there will be only three grains of corn delivered at each hill. When the foot lever 40 is shifted to the dotted-line position shown in Fig. 1, the nose of the stop dog 29 is in the plane of the three stops formed by the lower ends of the lugs 44, 46, and 47, and with this arrangement, the shaft 13 being given one-third of a complete rotation at each hill, there will be four grains delivered. In the intermediate position, the nose of the stop dog 29 will be in the plane of the six stops formed by the middle of the lug 44, the lower end of the lug 45, the upper ends of the lugs 46 and 47, and the lugs 50 and 51, and as with this arrangement the seed shaft can be given only one-sixth of a rotation for each hill, only two grains of corn will be discharged in a hill.

The connections between the stop sleeve 30 and the seed cup 12 are as follows:

Rigidly secured on the adjacent end of the stop sleeve 30 is an arm 52, which has a projection 53 extending from the outer end thereof, and serving as a support for one end of the strong helically-coiled contractile spring 54, the other end of which is connected to a hook 55 formed in a recess 56 in the detent disk 57, the hub of which is pinned to the seed shaft 13, so that the seed shaft is compelled to move with the detent disk 57. To prevent the possible backward movement of this disk 57 no matter where it stops, which backward movement would be fatal to the operation, I provide it with a smooth circular periphery 58 and surround it by an annular casting 59 in which it is free to rotate forwardly, the casting having the ears 60 and 60ª by which it is bolted to the bars 16 and 17, respectively. In the casting 59 I provide one or more tapering pockets 61, preferably having a hardened steel plate 62 secured therein and forming the bottom, between which and the periphery 58, the steel ball 63, held to its work by the helically-coiled expanding spring 64, is cramped the instant the disk 57 tends to move backward. Pivoted on the detent disk 57, as by the bolt 65, is the clutch dog 66, which has its operating nose 67 preferably formed by a hardened steel plate having an elongated slot in the center thereof and secured upon a seat 68 formed on the dog 66 by the bolt and nut 69. To regulate to a nicety the position of the nose of the dog and take up wear, I pass the set screw 70 through the lug 71 formed on the dog 66, and by turning the set screw 70, the position of the plate 67 can be adjusted as desired, and secured in the desired adjustment by the nut and bolt 69. By using this rectangular piece of metal and hardening it, I am enabled to make a dog that will wear almost indefinitely, as when it has become worn, it can be turned over or turned end for end, or both, and in this manner four wearing points are provided. The square points thus formed coöperate with the similar teeth 72 formed on the inner periphery of the driving cup 12, as best seen in Fig. 5. A helically-coiled expansible spring 73 is interposed between a lug 74 formed on the tail of the dog 66, and a lug 75 formed on the detent disk 57. As seen in Figs. 5, 6 and 7, the general shape of the dog 66 is angular, the dog being pivoted at one end, the engaging nose being at the angle, and the other end being formed with a pair of lugs 76 and 77. These lugs are separated by a space through which plays the end of a pin 78 projecting through an aperture 79 in the detent disk 57 and rigidly secured to the arm 52. It will be noted that the spring 54 tends to pull the stop sleeve 30 along with the detent disk 57, which is secured on the shaft 13, and it will be noted further that the connections and location of this spring are such that it is possible to slide the stop sleeve 30 along the seed shaft 13 in the manner heretofore described without disengaging the spring or interfering with its operation.

In describing the operation of the machine, I will assume that the clutch is operating, the parts then being as seen in Fig. 6, in which case the nose of the stop dog 29 is at some point between the two adjacent lugs on the stop sleeve 30, one of which lugs is approaching the said nose. During this movement, the teeth 72 of the driving cup 12 are engaged by the nose 67 of the clutch dog 66 pivoted on the detent disk 57, so that the rotation of the cup carries with it the detent disk 57, and also the seed shaft 13 upon which the hub of the detent disk is pinned. The connecting spring 54, one end of which is connected to the detent disk 57 and the other to the arm 52 on the stop sleeve 30, draws the latter with the former until the nose of the stop dog 29 is engaged by the advancing lug on the stop sleeve 30, which then necessarily stops. The motion of the detent disk 57, however, continues, putting the spring 54 under tension, but the pin 78 carried by the arm 52 on the stop sleeve 30, which has been in engagement with the forward lug 77 on the clutch dog 66, now stops, and the continued movement of the detent disk 57, and the clutch dog 66 pivoted thereon, carries the forward lug 77 away from the pin 78, which is finally engaged by the rear lug 76. When the pin 78 arrests the movement of the lugs of the clutch dog 66 and causes it to swing on its pivot 65 and releases its nose 67 from the teeth 72 of the driving cup 12, the spring 54, now under increased tension cannot pull the detent disk 57 back and allow the nose 67 of the clutch dog 66 to reëngage the teeth 72. Consequently, the stop sleeve 30, the detent disk 57, the seed shaft 13, and the clutch dog 66 are all held stationary while the driving cup continues its movement, the position of the parts now being those shown in Fig. 5. This continues until the next button on the check-row wire strikes the fork 21 and swings the rock shaft 18 so as to disengage the nose of the stop dog 29 from the lug on the stop sleeve 30 with which it is then in engagement. As soon as the stop dog 29 is moved sufficiently to disengage its nose from the lug, the spring 54, which has been under increased tension, jerks the stop sleeve 30 forward a trifle, so that the nose of the stop dog 29, as it returns to normal position, strikes on the outer surface of the stop lug, and the pin 78 having engaged the forward lug 77 on the clutch dog 66, swings the nose 67 of the dog into engagement with the teeth 72 of the driving cup 12, and the movement of the seed shaft 13 begins again, and continues until the nose of the stop dog 29 engages the next lug on the stop sleeve 30, when the action just described is repeated, and so on.

When the machine is being used as a check-rower and it is desired to change the number of grains to the hill, as is sometimes done in passing from poor land to better land, and vice versa, the operator, by moving the foot lever 40, is enabled to make the change without stopping the machine. As the nose of the stop dog 29 is in engagement with the periphery of the stop dog 30, and it has to pass from one extreme position to the other, the stop lugs 46, 48, 49 and 51 have their corners beveled off, as shown, in order to make a passage for the nose of the dog in spite of the fact that the operative faces of these lugs are closer together than the thickness of the nose.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States is:

1. In a device of the class described, the combination with a shaft, of a driving clutch member mounted thereon, a detent element having a circular periphery also mounted on the shaft but loosely relative to the driving clutch member, a driven clutch member pivoted on the detent element and adapted to engage the driving clutch member, a stop member also mounted on the shaft and having a limited rotary movement relative to the detent element, yielding connections between the detent element and the stop member causing the former to drive the latter, means for arresting the stop member, connections between the stop member and the driven clutch member to disengage the latter from the driving clutch member when the stop member ceases to rotate, said connections operating automatically to reëngage them when the stop member is released, and a ball and tapered pocket therefor coöperating with the periphery of the detent element to hold the latter against backward movement wherever it may stop.

2. In a device of the class described, the combination with a shaft, of a driving clutch member mounted thereon, a detent element also mounted on the shaft but loosely relative to the driving clutch member, a driven clutch member pivoted on the detent element and adapted to engage the driving clutch member, a stop member also mounted on the shaft and having a limited rotary movement relative to the detent element, yielding connections between the detent element and the stop member causing the former to drive the latter, means for arresting the stop member and connections between the stop member and the driven clutch member to disengage the latter from the driving clutch member when the stop member ceases to rotate, said connections operating automatically to reëngage them when the stop member is released, and means to prevent any possible backward movement of the detent element absolutely irrespective of where it stops.

3. In a device of the class described, the combination with a shaft, of a driving clutch member mounted thereon, a detent element having a circular periphery also mounted on the shaft but loosely relative to the driving clutch member, a driven clutch member pivoted on the detent element and adapted to engage the driving clutch member, a stop member also mounted on the shaft and having a limited rotary movement relative to the detent element, said stop member being provided with a series of stop surfaces, the angular distance between which regulates the angular movement of the shaft at each dropping action, yielding connections between the detent element and the stop member causing the former to drive the latter, a stop dog movable to and from the stop member, connections between the stop member and the driven clutch member to disengage the latter from the driving clutch member when the stop member ceases to rotate, said connections operating automatically to reëngage them when the stop member is released from the stop dog, and a ball and tapered pocket therefor coöperating with the periphery of the detent element to hold the latter against backward movement wherever it may stop.

4. In a device of the class described, the combination with a shaft, of a driving clutch member mounted thereon, a detent element also mounted on the shaft but loosely relative to the driving clutch member, a driven clutch member pivoted on the detent element and adapted to engage the driving clutch member, a stop member also mounted on the shaft and having a limited rotary movement relative to the detent element, said stop member being provided with a series of stop surfaces, the angular distance between which regulates the angular movement of the shaft at each dropping action, yielding connections between the detent element and the stop member causing the former to drive the latter, a stop dog movable to and from the stop member, connections between the stop member and the driven clutch member to disengage the latter from the driving clutch member when the stop member ceases to rotate, said connections operating automatically to reëngage them when the stop member is released from the stop dog, and means to prevent any possible backward movement of the detent element absolutely irrespective of where it stops.

5. In a device of the class described, the combination with a shaft, of a driving clutch member mounted thereon, a detent element having a circular periphery also mounted on the shaft but loosely relative to the driving clutch member, a driven clutch member pivoted on the detent element and adapted to engage the driving clutch member, a stop member also mounted on the shaft and having a limited rotary movement relative to the detent element, said stop member being provided with a series of stop surfaces, the angular distance between which regulates the angular movement of the shaft at each dropping action, yielding connections between the detent element and the stop member causing the former to drive the latter, a stop dog movable to and from the stop member, connections between the stop member and the driven clutch member to disengage the latter from the driving clutch member when the stop member ceases to rotate, said connections operating automatically to reëngage them when the stop member is released from the stop dog, means for sliding the stop member on the shaft to determine which series of stop surfaces shall be operative, and a ball and tapered pocket therefor coöperating with the periphery of the detent element to hold the latter against backward movement wherever it may stop.

6. In a device of the class described, the combination with a shaft, of a driving clutch member mounted thereon, a detent element also mounted on the shaft but loosely relative to the driving clutch member, a driven clutch member pivoted on the detent element and adapted to engage the driving clutch member, a stop member also mounted on the shaft and having a limited rotary movement relative to the detent element, said stop member being provided with a series of stop surfaces, the angular distance between which regulates the angular movement of the shaft at each dropping action, yielding connections between the detent element and the stop member causing the former to drive the latter, a stop dog movable to and from the stop member, connections between the stop member and the driven clutch member to disengage the latter from the driving clutch member when the stop member ceases to rotate, said connections operating automatically to reëngage them when the stop member is released from the stop dog, means for sliding the stop member on the shaft to determine which series of stop surfaces shall be operative, and means to prevent any possible backward movement of the detent element absolutely irrespective of where it stops.

7. In a device of the class described, the combination with a shaft, of a driving clutch member mounted thereon, a driven clutch member also mounted on the shaft but movable into and out of engagement with the driving clutch member, a stop member loosely mounted on the shaft, yielding connections between the driven clutch member and the stop member causing the former to drive the latter, means to stop and release the stop member at intervals, connections between the stop member and the driven clutch member to disengage the latter from the driving clutch member when the stop member ceases to rotate, said connections operating automatically to reëngage them when the stop member is released, a detent element on the shaft on which the driven clutch member is pivoted, and means to prevent any possible backward movement of the detent element absolutely irrespective of where it stops.

8. In a device of the class described, the combination with a shaft, of a driving clutch member mounted thereon, a driven clutch member also mounted on the shaft but movable into and out of engagement with the driving clutch member, a stop member loosely mounted on the shaft, yielding connections between the driven clutch member and the stop member causing the former to drive the latter, means to stop and release the stop member at intervals, connections between the stop member and the driven clutch member to disengage the latter from the driving clutch member when the stop member ceases to rotate, said connections operating automatically to reëngage them when the stop member is released, a detent element on the shaft on which the driven clutch member is pivoted, and means to prevent any possible backward movement of the detent element absolutely irrespective of where it stops, said means consisting of a ball and a stationary tapered pocket therefor coöperating with the circular periphery of the detent element.

In witness whereof, I have hereunto set my hand and affixed my seal, this 31 day of July A. D. 1916.

WILLIAM HOLLAND LETZ. [L. S.]

Witnesses:
   JACOB J. STEELE,
   IDA M. MINAS.

Copies of this patent may be obtained for five cents each, by addressing the "Commissioner of Patents, Washington, D. C."